(12) United States Patent
Wang et al.

(10) Patent No.: US 6,412,064 B1
(45) Date of Patent: *Jun. 25, 2002

(54) SYSTEM AND METHOD FOR RETIRING APPROXIMATELY SIMULTANEOUSLY A GROUP OF INSTRUCTIONS IN A SUPERSCALAR MICROPROCESSOR

(75) Inventors: Johannes Wang, Redwood City; Sanjiv Garg, Freemont; Trevor Deosaran, Sunnyvale, all of CA (US)

(73) Assignee: Seiko Epson Corporation, Tokyo (JP)

( * ) Notice: Subject to any disclaimer, the term of this patent is extended or adjusted under 35 U.S.C. 154(b) by 68 days.

This patent is subject to a terminal disclaimer.

(21) Appl. No.: 09/631,640

(22) Filed: Aug. 2, 2000

Related U.S. Application Data

(63) Continuation of application No. 09/009,412, filed on Feb. 20, 1998, now Pat. No. 6,131,157, which is a continuation of application No. 08/481,146, filed on Jun. 7, 1995, now Pat. No. 5,826,055, which is a continuation of application No. 07/877,451, filed on May 1, 1992, now abandoned.

(51) Int. Cl.[7] ................................................. G06F 9/30
(52) U.S. Cl. ....................................... 712/218; 712/217
(58) Field of Search ................................ 712/216, 217, 712/218

(56) References Cited

U.S. PATENT DOCUMENTS

| | | |
|---|---|---|
| 4,626,989 A | 12/1986 | Torii |
| 4,675,806 A | 6/1987 | Uchida |
| 4,722,049 A | 1/1988 | Lahti |
| 4,807,115 A | 2/1989 | Torng |
| 4,823,201 A | 4/1989 | Simon et al. |
| 4,903,196 A | 2/1990 | Pomerene et al. |
| 4,942,525 A | 7/1990 | Shintani et al. |

(List continued on next page.)

FOREIGN PATENT DOCUMENTS

| | | |
|---|---|---|
| EP | 0 515 166 | 11/1992 |
| WO | WO 88/09035 | 11/1988 |

OTHER PUBLICATIONS

Acosta et al., "An Instruction Issuing Approach to Enhancing Performance in Multiple Functional Unit Processors," *IEEE Transactions on Computers,* IEEE, vol. C–35, No. 9, Sep. 1986, pp. 815–828.

(List continued on next page.)

*Primary Examiner*—Richard L. Ellis
(74) *Attorney, Agent, or Firm*—Sterne, Kessler, Goldstein & Fox P.L.L.C.

(57) ABSTRACT

An system and method for retiring instructions in a superscalar microprocessor which executes a program comprising a set of instructions having a predetermined program order, the retirement system for simultaneously retiring groups of instructions executed in or out of order by the microprocessor. The retirement system comprises a done block for monitoring the status of the instructions to determine which instruction or group of instructions have been executed, a retirement control block for determining whether each executed instruction is retirable, a temporary buffer for storing results of instructions executed out of program order, and a register array for storing retirable-instruction results. In addition, the retirement control block further controls the retiring of a group of instructions determined to be retirable, by simultaneously transferring their results from the temporary buffer to the register array, and retires instructions executed in order by storing their results directly in the register array. The method comprises the steps of monitoring the status of the instructions to determine which group of instructions have been executed, determining whether each executed instruction is retirable, storing results of instructions executed out of program order in a temporary buffer, storing retirable-instruction results in a register array and retiring a group of retirable instructions by simultaneously transferring their results from the temporary buffer to the register array, and retiring instructions executed-in order by storing their results directly in the register array.

41 Claims, 5 Drawing Sheets

U.S. PATENT DOCUMENTS

| | | |
|---|---|---|
| 5,067,069 A | 11/1991 | Fite et al. |
| 5,072,364 A | 12/1991 | Jardine et al. |
| 5,109,495 A | 4/1992 | Fite et al. |
| 5,125,083 A | 6/1992 | Fite et al. |
| 5,148,536 A | 9/1992 | Witek et al. |
| 5,167,026 A | 11/1992 | Murray et al. |
| 5,179,673 A | 1/1993 | Steely, Jr. et al. |
| 5,197,132 A | 3/1993 | Steely, Jr. et al. |
| 5,214,763 A | 5/1993 | Blaner et al. |
| 5,222,240 A | 6/1993 | Patel |
| 5,226,126 A | 7/1993 | McFarland et al. |
| 5,230,068 A | 7/1993 | Van Dyke et al. |
| 5,251,306 A | 10/1993 | Tran |
| 5,317,720 A | 5/1994 | Stamm et al. |
| 5,345,569 A | 9/1994 | Tran |
| 5,355,457 A | 10/1994 | Shebanow et al. |
| 5,367,660 A | 11/1994 | Gat et al. |
| 5,390,355 A | 2/1995 | Horst |
| 5,398,330 A | 3/1995 | Johnson |
| 5,430,888 A | 7/1995 | Witek et al. |
| 5,442,757 A | 8/1995 | McFarland et al. |
| 5,487,156 A | 1/1996 | Popescu et al. |
| 5,560,032 A | 9/1996 | Nguyen et al. |
| 5,561,776 A | 10/1996 | Popescu et al. |
| 5,568,624 A | 10/1996 | Sites et al. |
| 5,574,927 A | 11/1996 | Scantlin |
| 5,592,636 A | 1/1997 | Popescu et al. |
| 5,625,837 A | 4/1997 | Popescu et al. |
| 5,627,983 A | 5/1997 | Popescu et al. |
| 5,630,149 A | 5/1997 | Bluhm |
| 5,651,125 A | 7/1997 | Witt et al. |
| 5,708,841 A | 1/1998 | Popescu et al. |
| 5,768,575 A | 6/1998 | McFarland et al. |
| 5,778,210 A | 7/1998 | Henstrom et al. |
| 5,797,025 A | 8/1998 | Popescu et al. |
| 5,826,055 A | 10/1998 | Wang et al. ................. 712/218 |
| 5,832,205 A | 11/1998 | Kelly et al. |
| 5,832,293 A | 11/1998 | Popescu et al. |
| 5,961,629 A | 10/1999 | Nguyen et al. ............. 712/215 |

OTHER PUBLICATIONS

Agerwala et al., "High Performance Reduced Instruction Set Processors," IBM Research Division, Mar. 31, 1987, pp. 1–61.

Butler, M. and Patt, Y., "An Improved Area–Efficient Register Alias Table for Implementing HPS," University of Michigan, Ann Arbor, Michigan, Jan. 1990.

Butler et al., "Single Instruction Stream Parallelism Is Greater Than Two," Proceedings of the 18$^{th}$ Annual International Symposium on Computer Architecture, Association for Computing Machinery, May 1991, pp. 276–286.

Charlesworth, A.E., "An Approach to Scientific Array Processing: The Architectural Design of the AP–1208/FPS–164 Family," Computer, IEEE, vol. 14, Sep. 1981, pp. 18–27.

Colwell et al., "A VLIW Architecture for a Trace Scheduling Compiler," Proceedings of the 2nd International Conference on Architectural Support for Programming Languages and Operating Systems, Association for Computing Machinery, Oct. 1987, pp. 180–192.

Dwyer, A Multiple, Out–of–Order Instruction Issuing System for Superscalar Processors, (All), Aug. 1991.

Foster et al., "Percolation of Code to Enhance Parallel Dispatching and Execution," IEEE Trans. On Computers, Dec. 1971, pp. 1411–1415.

Gee et al., "The Implementation of Prolig via VAX 8600 Microcode," Proceedings of Micro 19, New York City, Oct. 1986, pp. 1–7.

Gross et al., "Optimizing Delayed Branches," Proceedings of the 5th Annual Workshop on Microprogramming, IEEE, Oct. 5–7, 1982, pp. 114–120.

Hennessy, J. and Patterson, D., Computer Architecture: A Quantitative Approach, 1990, Chapters 6.4, 6.7 and p. 449.

Hwu et al., "Checkpoint Repair for High–Performance Out–of–Order Execution Machines," IEEE Trans. On Computers, IEEE, vol. C–36, No. 12, Dec. 1987, pp. 1496–1514.

Lightner, B. and Hill, G., "The Metaflow Lightning Chipset," IEEE Publication, IEEE, 1991 pp. 13–16.

Patt et al., "Critical Issues Regarding A High Performance Microarchitecture," The 18$^{th}$ Workshop on Microprogramming, Association for Computing Machinery, Pacific Grove, California, Dec. 3–6, 1985, IEEE Computer Order No. 653, pp. 109–116.

Patt et al., "HPS, A New Microarchitecture: Rationale and Introduction," The 18$^{th}$ Annual Workshop on Microprogramming, Association for Computing Machinery, Pacific Grove, California, Dec. 3–6, 1985, IEEE Computer Society Order No. 653, pp. 103–108.

Patt et al., "Run–Time Generation of HPS Microinstructions From a VAX Instruction Stream," Proceedings of MICRO 19 Workshop, New York, Oct. 1986, pp. 1–7.

Peleg et al., "Future Trends in Microprocessors: Out–of–Order Execution, Spec Branching and Their CISC Performance Potential," Mar. 1991.

Pleszkun et al., "The Performance Potential of Multiple Functional Unit Processors," Proceedings of the 15th Annual Symposium on Computer Architecture, Jun. 1988, pp. 37–44.

Pleszkun et al., "WISQ: A Restartable Architecture Using Queues," Proceedings of the 14th International Symposium on Computer Architecture, Jun. 1987, pp. 290–299.

Popescu et al., "The Metaflor Architecture," IEEE Micro, vol. 11, No. 3, Jun. 1991, pp. 10–13 and 63–73.

Smith et al., "Implementation of Precise Interrupts in Pipelined Processors," Proceedings of the 12th Annual International Symposium on Computer Architecture, IEEE, Jun. 1985, pp. 36–44.

Smith et al., "Limits on Multiple Instruction Issue," Proceedings of the 3rd International Conference on Architectural Support for Programming Languages and Operating Systems, Association for Computing Machinery, Apr. 1989, pp. 290–302.

Sohi, G.S. and Vajepeyam, S., "Instruction Issue Logic for High–Performance, Interruptable Pipelined Processors," Conference Proceedings of the 14$^{th}$ International Symposium on Computer Architecture, Association for Computing Machinery, Jun. 2–5, 1987, pp. 27–34.

Thornton, J.E., Design of a Computer: The Control Data 6600, Control Data Corporation, 1970, pp. 58–140.

Tjaden et al., "Detection and Parallel Execution of Independent Instructions," IEEE Trans. On Computers, vol. C–19, No. 10, Oct. 1970, pp. 889–895.

Tjaden et al., "Representation of Concurrency with Ordering Matrices," IEEE Trans. On Computers, vol. C–22, No. 8, Aug. 1973, pp. 752–761.

Tjaden, Representation and Detection of Concurrency Using Ordering Matrices, (Dissertation), 1972, pp. 1–199.

Tomasulo, R.M., "An Efficient Algorithm for Exploiting Multiple Arithmetic Units," *IBM Journal,* vol. 11, Jan. 1967, pp. 25–33.

Uht, A.K., "An Efficient Hardware Algorithm to Extract Concurrency From General–Purpose Code," Proceedings of the 19th Annual Hawaii International Conference on System Sciences, 1986, pp. 41–50.

Uvieghara et al., "An Experimental Single–Chip Data Flow CPU," Symposium on ULSI Circuits Design Digest of Technical Papers, May 1990.

Uvieghara et al., "An Experimental Single–Chip Data Flow CPU," *IEEE Journal of Solid–State Circuits,* vol. 27, No. 1, Jan. 1992, pp. 17–28.

Wedig, R.G., *Detection of Concurrency In Directly Executed Language Instruction Streams,* (Dissertation), Jun. 1982, pp. 1–179.

Weiss et al., "Instruction Issue Logic in Pipelined Supercomputers," Reprinted from *IEEE Trans. on Computers,* IEEE, vol. C–33, No. 11, Nov. 1984, pp. 1013–1022.

Wilson et al., "On Turning Microarchitecture of an HPS Implementation of the VAX," Proceedings of MICRO 20, Dec. 1987, pp. 162–167.

Hwu, W. and Patt, Y., "Design Choices for the HPSm Microprocessor Chip," Proceedings of the Twentieth Annual Hawaii International Conference on System Sciences, 1987, pp. 330–336.

Hwu et al., "Experiments with HPS, a Restricted Data Flow Microarchitecture for High Performance Computers," COMPCON 86, 1986.

Hwu et al., "Exploiting Parallel Microprocessor Microarchitectures with a Compiler Code Generator," Proceedings of the 15th Annual Symposium on Computer Architecture, IEEE, Jun. 1988, pp. 45–53.

Hwu et al., "An HPS Implementation of VAX: Initial Design and Analysis," Proceedings of the Nineteenth Annual Hawaii International Conference on System Sciences, 1986, pp. 282–291.

Hwu et al., "HPSm, a High Performance Restricted Data Flow Architecture Having Minimal Functionality," Proceedings of the ISCA–13, Tokyo, Japan, Jun. 2–5, IEEE, 1986, pp. 297–306.

Hwu, W. and Patt, Y., "HPSm2: A Refined Single–Chip Microengine," HICSS '88, 1988, pp. 30–40.

*IBM Journal of Research and Development,* International Business Machines Corporation, vol. 34, No. 1, Jan. 1990, pp. 1–70.

Johnson, M., *Superscalar Microprocessor Design,* Prentice Hall, 1991, pp. 87–102 and 103–125.

Johnson, W. M., *Super–Scalar Processor Design,* (Dissertation), Copyright 1989, 134 pages.

Jouppi et al., "Available Instruction–Level Parallelism for Superscalar and Superpipelined Machines," Proceedings of the 3rd International Conference on Architectural Support for Programming Languages and Operating Systems, Association for Computing Machinery, Apr. 1989, pp. 272–282.

Keller, R.M., "Look–Ahead Processors," *Computing Surveys,* Association for Computing Machinery, vol. 7, No. 4, Dec. 1975, pp. 177–195.

Lightner et al., "The Metaflow Architecture," *IEEE Micro Magazine,* Jun. 1991, pp. 11–12 and 63–68.

FIG. 3
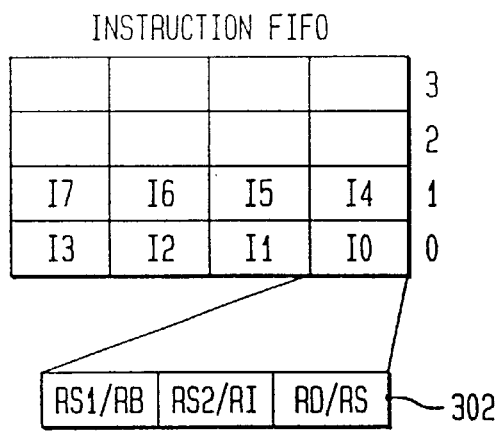
FIG. 5A
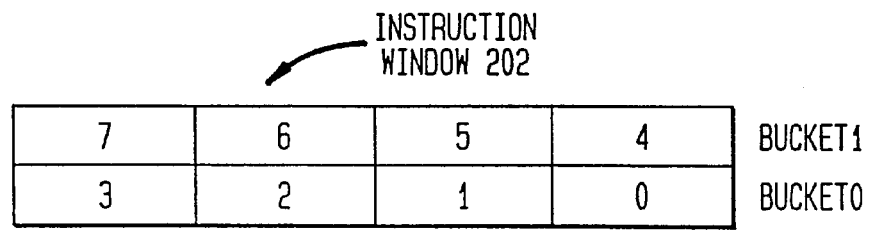
FIG. 5B

SYSTEM AND METHOD FOR RETIRING APPROXIMATELY SIMULTANEOUSLY A GROUP OF INSTRUCTIONS IN A SUPERSCALAR MICROPROCESSOR

This application is a continuation of application Ser. No. 09/009,412 filed Feb. 20, 1998, now U.S. Pat. No. 6,131, 157, which is a continuation of application Ser. No. 08/481, 146 filed Jun. 7, 1995, now U.S. Pat. No. 5,826,055, which is a continuation of application Ser. No. 07/877,451, filed May 1, 1992, now abandoned.

CROSS-REFERENCE TO RELATED APPLICATIONS

The following patents are related to the subject matter of the present application and are incorporated by reference in their entirety herein:

"Superscalar RISC Instruction Scheduling", U.S. Pat. No. 5,497,499, issued Mar. 5, 1996; and "High Performance, Superscalar-Based Computer System with Out-of-Order Instruction Execution", U.S. Pat. No. 5,539,911, issued Jul. 23, 1996.

The disclosures of the above applications are incorporated herein by reference.

BACKGROUND OF THE INVENTION

1. Field of the Invention

The present invention relates generally to the field of superscalar processors, and more particularly, to a system and method for retiring multiple instructions executed out-of-order in a superscalar processor.

2. Discussion of Related Art

One method of increasing performance of microprocessor-based systems is overlapping the steps of different instructions using a technique called pipelining. In pipelining operations, various steps of instruction execution (e.g. fetch, decode and execute) are performed by independent units called pipeline stages. The steps are performed in parallel in the various pipeline stages so that the processor can handle more than one instruction at a time.

As a result of pipelining, processor-based systems are typically able to execute more than one instruction per clock cycle. This practice allows the rate of instruction execution to exceed the clock rate. Processors that issue, or initiate execution of, multiple independent instructions per clock cycle are known as superscalar processors. A superscalar processor reduces the average number of cycles per instruction beyond what is possible in ordinary pipelining systems.

In a superscalar system, the hardware can execute a small number of independent instructions in a single clock cycle. Multiple instructions can be executed in a single cycle as long as there are no data dependencies, procedural dependencies, or resource conflicts. When such dependencies or conflicts exist, only the first instruction in a sequence can be executed. As a result, a plurality of functional units in a superscalar architecture can not be fully utilized.

To better utilize a superscalar architecture, processor designers have enhanced processor look-ahead capabilities; that is the ability of the processor to examine instructions beyond the current point of execution in an attempt to find independent instructions for immediate execution. For example, if an instruction dependency or resource conflict inhibits instruction execution, a processor with look-ahead capabilities can look beyond the present instruction, locate an independent instruction, and execute it.

As a result, more efficient processors, when executing instructions, put less emphasis on the order in which instructions are fetched and more emphasis on the order in which they are executed. As a further result, instructions are executed out of order.

For a more in-depth discussion of superscalar processors, see Johnson, *Superscalar Microprocessor Design*, Prentice Hall, Inc. (1991).

Scenarios occur whereby the execution of the instructions is interrupted or altered, and the execution must be restarted in the correct order. Two such scenarios will be described.

In a first scenario, during look-ahead operations, many processor designs employ predictive techniques to predict a branch that the program is going to follow in that particular execution. In these systems, the instructions fetched and executed as a result of look-ahead operations are instructions from the branch of code that was predicted. High instruction throughput is achieved by fetching and issuing instructions under the assumption that branches chosen are predicted correctly and that exceptions do not occur. This technique, known as speculative execution, allows instruction execution to proceed without waiting for the completion of previous instructions. In other words, execution of the branch target instruction stream begins before it is determined whether the conditional branch will be taken.

Since the branch predication occasionally fails, the processor must provide recovery mechanisms for canceling the effects of instructions that were speculatively executed. The processor must also provide restart mechanisms to reestablish the correct instruction sequence.

In a second scenario, out-of-order completion makes it difficult to deal with exceptions. Exceptions are created by instructions when the instruction cannot be properly executed by hardware alone. These exceptions are commonly handled by interrupts, permitting a software routine to correct the situation. Once the routine is completed, the execution of the interrupted program must be restarted so it can continue as before the exception.

Processors contains information that must be saved for a program to be suspended and then restored for execution to continue. This information is known as the 'state' of the processor. The state information typically includes a program counter (PC), an interrupt address register (LAR), and a program status register (PSR); the PSR contains status flags such as interrupt enable, condition codes, and so forth.

As program instructions are executed, the state machine is updated based on the instructions. When execution is halted and must later be restarted (i.e., one of the two above scenarios occurs) the processor looks to the state machine for information on how to restart execution. In superscalar processors, recovery and restart occur frequently and must be accomplished rapidly.

In some conventional systems, when instructions are executed out of order, the state of the machine is updated out of order (i.e., in the same order as the instructions were executed). Consequently, when the processor goes back to restart the execution, the state of the machine has to be 'undone' to put it back in a condition such that execution may begin again.

To understand conventional systems, it is helpful to understand some common terminology. An in-order state is made up of the most recent instruction result assignments resulting from a continuous sequence of executed instructions. Assignments made by instructions completed out-of-order where previous instruction(s) have not been completed, are not included in this state.

If an instruction is completed and all previous instructions have also been completed, the instruction's results can be stored in the in-order state. When instructions are stored in the in-order state, the machine never has to access results from previous instructions and the instruction is considered 'retired.'

A look-ahead state is made up of all future assignments, completed and uncompleted, beginning with the first uncompleted instruction. Since there are completed and uncompleted instructions, the look-ahead state contains actual as well as pending register values.

Finally, an architectural state is made up of the most recently completed assignment of the continuous string of completed instructions and all pending assignments to each register. Subsequent instructions executed out of order must access the architectural state to determine what state the register would be in had the instruction been executed in order.

One method used in conventional systems to recover from misdirected branches and exceptions is known as checkpoint repair. In checkpoint repair, the processor provides a set of logical spaces, only one of which is used for current execution. The other logical spaces contain backup copies of the in-order state, each corresponding to a previous point in execution. During execution, a checkpoint is made by copying the current architectural state to a backup space. At this time, the oldest backup state is discarded. The checkpoint is updated as instructions are executed until an in-order state is reached. If an exception occurs, all previous instructions are allowed to execute, thus bringing the checkpoint to the in-order state.

To minimize the amount of required overhead, checkpoints are not made at every instruction. When an exception occurs, restarting is accomplished by loading the contents of the checkpointed state preceding the point of exception, and then executing the instructions in order up to the point of exception. For branch misprediction recovery, checkpoints are made at every branch and contain the precise state at which to restart execution immediately.

The disadvantage of checkpoint repair is that it requires a tremendous amount of storage for the logical spaces. This storage overhead requires additional chip real estate which is a valuable and limited resource in the microprocessor.

Other conventional systems use history buffers to store old states that have been superseded by new states. In this architecture, a register buffer contains the architectural state. The history buffer is a last-in first-out (LIFO) stack containing items in the in-order state superseded by look-ahead values (i.e., old values that have been replaced by new values), hence the term 'history.'

The current value (prior to decode) of the instruction's destination register is pushed onto the stack. The value at the bottom of the stack is discarded if its associated instruction has been completed. When an exception occurs, the processor suspends decoding and waits until all other pending instructions are completed, and updates the register file accordingly. All values are then popped from the history buffer in LIFO order and written back into the register file. The register file is now at the in-order state at the point of exception.

The disadvantage associated with the history buffer technique is that several clock cycles are required to restore the in-order state.

Still other conventional systems use a reorder buffer managed as a first-in first-out (FIFO) queue to restart after exceptions and mispredictions. The reorder buffer contains the look-ahead state, and a register file contains the in-order state. These two can be combined to determine the architectural state. When an instruction is decoded, it is assigned an entry at the top of the reorder buffer. When the instruction completes, the result value is written to the allocated entry. When the value reaches the bottom of the buffer, it is written into the register file if there are no exceptions. If the instruction is not complete when it reaches the bottom, the reorder buffer does not advance until the instruction completes. When an exception occurs, the reorder buffer is discarded and the in-order state is accessed.

The disadvantage of this technique is that it requires associative lookup to combine the in-order and look-ahead states. Furthermore, associative lookup is not straightforward since it must determine the most recent assignments if there is more than one assignment to a given register. This requires that the reorder buffer be implemented as a true FIFO, rather than a more simple, circularly addressed register array.

What is needed then is a system and method for maintaining a current state of the machine and for efficiently updating system registers based on the results of instructions executed out of order. This system and method should use a minimum of chip real estate and power and should provide quick recovery of the state of the machine up to the point of an exception. Furthermore, the system should not require complex steps of associative lookup to obtain the most recent value of a register.

SUMMARY OF THE INVENTION

The present invention is a system and method for retiring instructions issued out of order in a superscalar microprocessor system. According to the technique of the present invention, results of instructions executed out of order are first-stored in a temporary buffer until all previous instructions have been executed. Once all previous instructions have been executed and their results stored in order in a register array, the results of the instruction in question can be written to the register array and the instruction is considered retired.

The register array contains the current state of the machine. To maintain the integrity of register array data, only results of instructions are not written to the register array until the results of all previous instructions have been written. In this manner, the state of the machine is updated in order, and situations such as exceptions and branch mispredictions can be handled quickly and efficiently.

The present invention comprises means for assigning and writing instruction results to a temporary storage location, transferring results from temporary storage to the register array so that the register array is updated in an in-order fashion and accessing results in the register array and temporary storage for subsequent operations.

Further features and advantages of the present invention, as well as the structure and operation of various embodiments of the present invention, are described in detail below with reference to the accompanying drawings.

BRIEF DESCRIPTION OF THE DRAWINGS

FIG. 3 is a diagram further illustrating the instruction FIFO and the instruction window.

FIG. 5A shows the configuration of an instruction window.

FIG. 5B is a diagram illustrating the assignment of instruction results to storage locations in a temporary buffer according to the present invention.

In the drawings, like reference numbers indicate identical or functionally similar elements. Additionally, the left-most digit of a reference number identifies the drawing in which the reference number first appears.

DETAILED DESCRIPTION

1. Overview

The present invention provides a system and a method for retiring completed instructions such that to the program it appears that the instructions are executed sequentially in the original program order. The technique of the present invention is to store all out-of-order instruction results (results of instructions not executed in the program order) in a temporary buffer until all previous instructions are complete without any exceptions. The results are then transferred from the temporary buffer to a register array which represents the official state.

When an instruction is retired, all previous instructions have been completed and the retired instruction is officially completed. When instructions are retired according to the technique of the present invention, the state of the machine is updated in order. Therefore, when an exception occurs, out-of-order execution is suspended and all uncompleted instructions prior to the exception are executed and retired. Thus, the state of the machine is up to date as of the time of the exception. When the exception is complete, out-of-order execution resumes from the point of exception. When a branch misprediction is detected, all instructions prior to the branch are executed and retired, the state of the machine is now current, and the machine can restart at that point. All results residing in the temporary buffer from instructions on the improper branch are ignored. As new instructions from the correct branch are executed, their results are written into the temporary buffer, overwriting any results obtained from the speculatively executed instruction stream.

2. Environment

Figure 1:
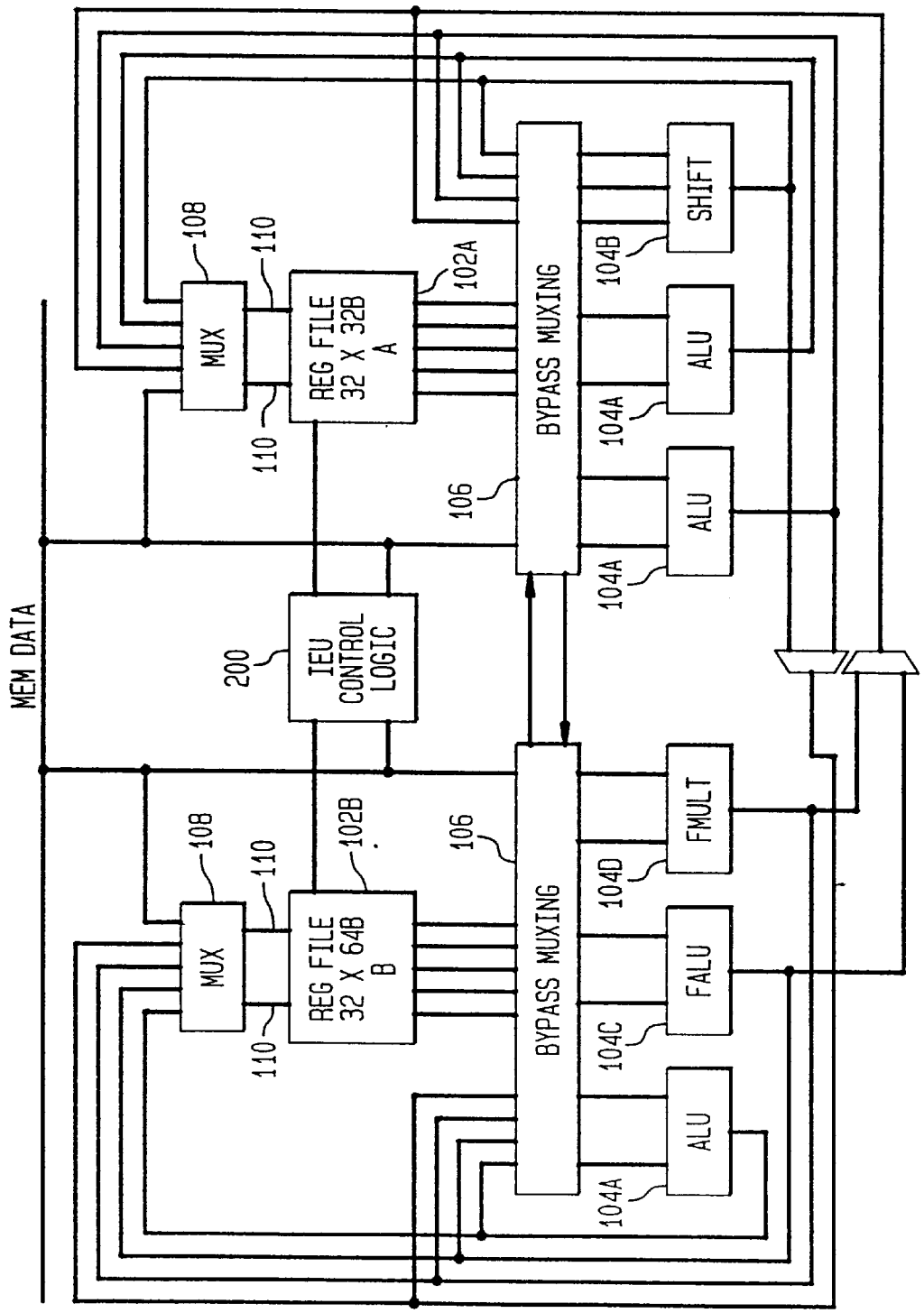
FIG. 1 is a data path diagram of a superscalar instruction execution unit.

FIG. 1 illustrates a block diagram of a superscalar Instruction Execution Unit (IEU) capable of out-of-order instruction issuing. Referring to FIG. 1, there are two multi-ported register files 102A, 102B which hold general purpose registers. Each register file 102 provides five read ports and two write ports. Each write port allows two writes per cycle. In general, register file 102A holds only integer data while register file 102B can hold both floating point and integer data.

Functional units 104 are provided to perform processing functions. In this example, functional units 104 are three arithmetic logic units (ALUs) 104A, a shifter 104B, a floating-point ALU 104C, and a floating-point multiplier 104D. Floating-point ALU 104C and floating-point multiplier 104D can execute both integer and floating-point operations.

Bypass multiplexers 106 allow the output of any functional unit 104 to be used as an input to any functional unit 104. This technique is used when the results of an instruction executed in one clock cycle are needed for the execution of another instruction in the next clock cycle. Using bypass multiplexers 106, the result needed can be input directly to the appropriate functional unit 104. The instruction requiring those results can be issued on that same clock cycle. Without bypass multiplexers 106, the results of the executed instruction would have to be written to register file 102 on one clock cycle and then be output to the functional unit 104 on the next clock cycle. Thus, without bypass multiplexers 106 one full clock cycle is lost. This technique, also known as forwarding, is well known in the art and is more fully described in Hennessy et al., *Computer Architecture a Quantitative Approach*, Morgan Kaufmann Publishers (1990) on pages 260–262.

Selection multiplexers 108 provide a means for selecting the results from functional units 104 to be written to register files 102.

Figure 2:
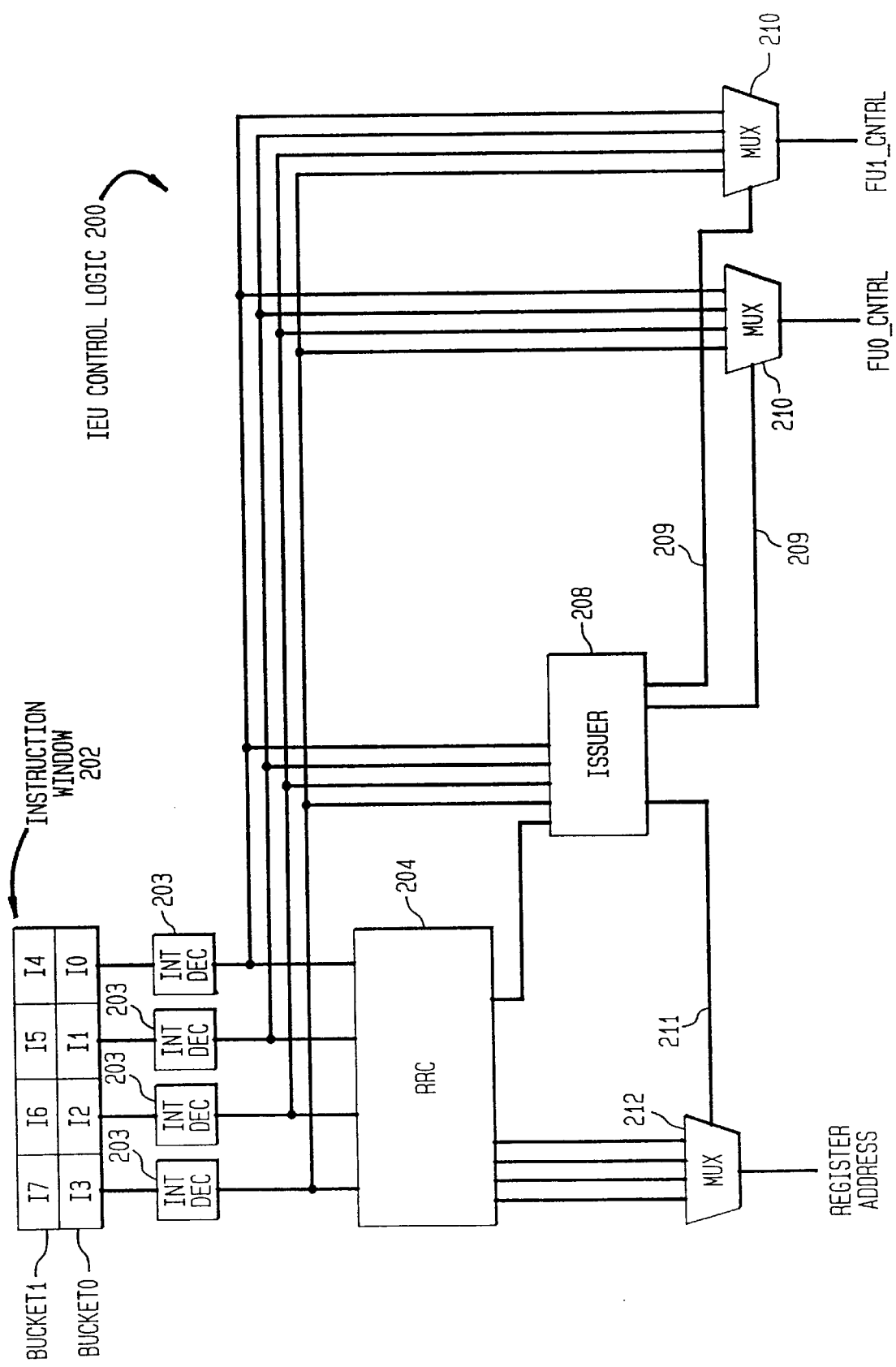
FIG. 2 is a block diagram illustrating the functions of the superscalar instruction execution unit.

FIG. 2 illustrates a block diagram of IEU control logic 200 for the IEU shown in FIG. 1. IEU control logic 200 includes an instruction window 202. Instruction window 202 defines the instructions which IEU control logic 200 may issue during one clock cycle. Instruction window 202 represents the bottom two locations in an instruction buffer, which is a FIFO register containing instructions to be executed. This instruction buffer is also referred to as an instruction FIFO. As instructions are completed, they are flushed out at the bottom and new instructions are dropped in at the top. The bottom location of instruction window 202 is referred to as bucket 0 and the top location of instruction window 202 is referred to as bucket 1.

When all four instructions in bucket 0 have been retired, they are flushed out of bucket 0, the instructions in bucket 1 drop into bucket 0 and a new group of four instructions drops into bucket 1. Instruction window 202 may be implemented using a variety of techniques. One such technique is fully described in the commonly owned, co-pending application titled "Superscalar Risc Instruction Scheduling" (Ser. No. 07/860,719), filed Mar. 31, 1992, the disclosure of which is incorporated herein by reference.

In the current example, instruction window 202 contains eight instructions. Therefore, IEU control logic 200 tries to issue a maximum number of instructions from among these eight during each clock cycle. Instruction decoding occurs in decoders 203. Instruction decoding is an ongoing process performed in IEU control logic 200. Instructions must be decoded before dependency checking (discussed below), issuing and execution occur.

IEU control logic 200 also contains register renaming circuitry (RRC) 204 which performs two related functions. The first function performed is data dependency checking. Once data dependency checking is complete, RRC 204 assigns tags to each instruction which are used to track the location of instruction operands and results.

Data dependency checking logic, residing in RRC 204, is used for checking instructions for dependencies. In checking for dependencies, the data dependency checking logic looks at the various register file source and destination addresses to determine whether one or more previous instructions must be executed before a subsequent instruction may be executed. FIG. 3 further illustrates instruction window 202 and the instruction FIFO. Referring to FIG. 3, various register file source and. destination addresses 302 of the instruction I0 must be checked against the source and destination addresses of all other instructions.

Referring back to FIG. 2, since instruction window 202 in this example can contain 8 instructions, the IEU can look at eight instructions for scheduling purposes. All source register addresses must be compared with all previous destination addresses. If one instruction is dependent upon completion of a previous instruction, these two instructions cannot be completed out of order. In other words, if instruction I2 requires the results of instruction I1, a dependency exists and I1 must be executed before I2. Some instructions may be long-word instructions, which require extra care when checking for dependencies. For long-word instructions, the instructions occupy two registers both of which must be checked when examining this instruction for dependencies.

An additional function performed in RRC 204 is tag assignment. Proper tag assignment is crucial to effective instruction retirement according to the present invention. Each instruction in instruction window 202 is assigned a tag based on its location in instruction window 202, and based on the results of data dependency checking discussed above. The tag assigned to each instruction indicates where in a temporary buffer that instruction's results are to be stored until that instruction is retired and whether all of the previous instructions on which that instruction is dependent have been completed. Tag assignment and the temporary buffer are discussed in more detail below.

A further function performed by IEU control logic 200 is determining which instructions are ready for issuing. An instruction issuer 208 issues instructions to the appropriate functional unit 104 for execution. Circuitry within RRC 204 determines which instructions in instruction window 202 are ready for issuing and sends a bit map to instruction issuer 208 indicating which instructions are ready for issuing. Instruction decode logic 203 indicates the resource requirement for each instruction. Issuer 208 also receives information from functional units 104 concerning resource availability. This information is scanned by issuer 208 and an instruction is selected for issuing.

Instruction issuer 208 sends a control signal 209 to multiplexers 210 telling them which instruction to send to functional units 104. Instruction issuer 208 also sends a control signal 211 to multiplexer 212 configuring it to send the appropriate register address to configure the register that is to receive the results of the instruction. Depending on the availability of functional units 104, issuer 208 may issue multiple instructions each clock cycle.

Referring again to FIGS. 1 and 2, once an instruction is issued to functional units 104 and executed by the same, register files 102A and 102B must be updated to reflect the current state of the machine. When the machine has to 'go back' and restart an execution because of an exception or a branch misprediction, the state of the machine must reflect the up-to-date state at the time the exception or branch occurred. Even when instructions are issued and executed out of order, the state of the machine must still reflect, or be recoverable to, the current state at the time of exception or branching.

The Instruction Retirement Unit (IRU) of the present invention, retires the instructions as if they were executed in order. In this manner, the state of the machine is updated, in order, to the point of the most recent instruction in a sequence of completed instructions.

The present invention provides a unique system and method for retiring instructions and updating the state of the machine such that when a restart is required due to an exception or a branch misprediction, the current state up to that point is recoverable without needing to wait for the register file to be rebuilt or reconstructed to negate the effects of out-of-order executions.

3. Implementations

Figure 4:
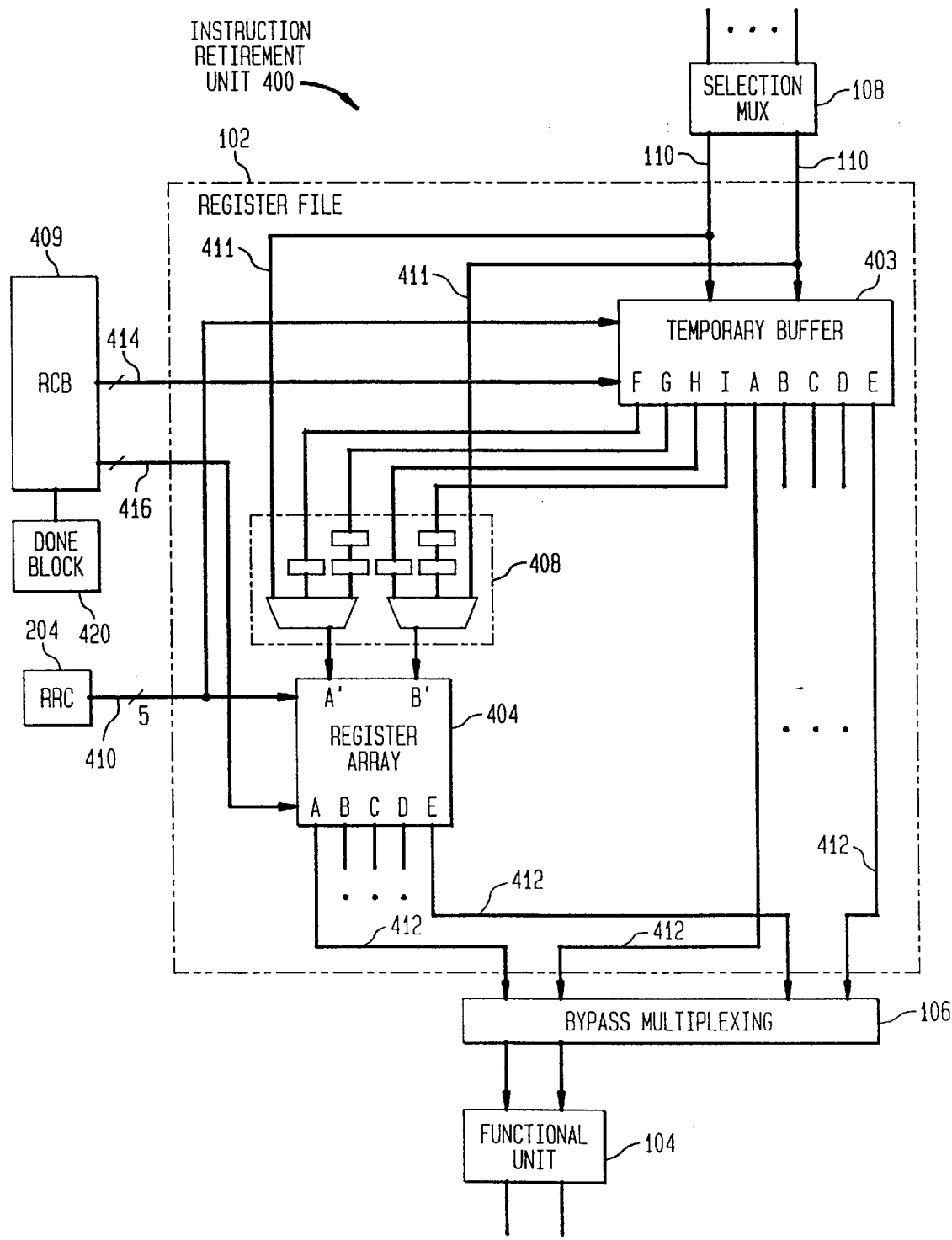
FIG. 4 is a diagram illustrating instruction retirement according to the present invention.

FIG. 4 illustrates a high-level diagram of an Instruction Retirement Unit 400 (referred to as "IRU 400") of the present invention. IRU 400 and its functions are primarily contained within register file 102 and a retirement control block (RCB) 409. As shown in FIG. 4, the functions performed by the environment are also critical to proper instruction retirement.

Referring to FIG. 4, the operation of IRU 400 will now be described. As discussed in subsection 2 of this application, the instructions executed in the superscalar processor environment are executed out of order, and the out-of-order results cannot be written to the registers until all previous instructions' results are written in order. A register array 404 represents the in-order state of the machine. The results of all instructions completed without exceptions, who also have no previous uncompleted instructions, are stored in register array 404. Once the results are stored in register array 404, the instruction responsible for those results is considered 'retired.'

If an instruction is completed out of order, and there are previous instructions that have not been completed, the results of that instruction are temporarily stored in a temporary buffer 403. Once all instructions previous to the instruction in question have been executed and their results transferred to register array 404, the instruction in question is retirable, and its results can be transferred from temporary buffer 403 to register array 404. Once this is done, the instruction is considered retired. A retirable instruction then, is an instruction for which two conditions have been met: (1) it is completed, and (2) there are no unexecuted instructions appearing earlier in the program order.

If the results of an executed instruction are required by a subsequent instruction, those results will be made available to the appropriate functional unit 104 regardless of whether they are in temporary buffer 403 or register array 404.

Referring to FIGS. 1, 2, and 4, IRU 400 will be more fully described. Register file 102 includes a temporary buffer 403, a register array 404 and selection logic 408. There are two input ports 110 used to transfer results to temporary buffer 403 and register array 404. Control signals (not shown) generated in IEU control logic 200 are used to select the results in selection multiplexer 108 when the results are ready to be stored in register file 102. Selection multiplexer 108 receives data from various functional units and multiplexes this data onto input ports 110.

Two input ports 110 for each register file 102 in the preferred embodiment permit two simultaneous register operations to occur. Thus, input ports 110 provide two full register width data values to be written to temporary buffer 403. This also permits multiple register locations to be written in one clock cycle. The technique of writing to multiple register address locations in one clock cycle is fully described below.

FIGS. 5A and B illustrate the allocation of temporary buffer 403. FIG. 5A shows a configuration of instruction window 202, and FIG. 5B shows an example ordering of data results in temporary buffer 403. As noted previously, there can be a maximum of eight pending instructions at any one time. Each instruction may require one or two of temporary buffer's 403 eight register locations 0 through 7, depending on whether it is a regular-length or a long-word instruction.

The eight pending instructions in instruction window 202 are grouped into four pairs. The first instructions from buckets 0 and 1 (i.e. I0 and I4) are a first pair. The other pairs, I1 and I5, etc., are similarly formed. A result of I0 (I0RD) is stored in register location 0, and a result of I4 (I4RD) is stored in register location 1. If I0 is a long-word entry, I0RD, the low-word result (result of the first half of a long-word instruction) is still stored in location 0, but now the high-word result (I0RD+1, from the second half of the instruction) is stored in location 1. This means that the low-word result of I4 does not have a space in temporary buffer 403, and therefore can not be issued at this time.

Tags are generated in RRC 204 and assigned to each instruction before the instruction's results are store in temporary buffer 403. This facilitates easy tracking of results, particularly when instructions are executed out of order. Each tag comprises three bits, for example, to indicate addresses for writing the instruction's results in temporary buffer 403. These three bits are assigned according to the instructions' locations in instruction window 202. The tags are used by the RRC to locate results in temporary buffer 403 if they are operands for other instructions, for example. Table 1 illustrates a representative assignment for these three tag bits.

TABLE 1

Tag assignment

| INSTRUCTION | TAG | LOCATION |
|---|---|---|
| 0 | 000 | 0 |
| 1 | 010 | 2 |
| 2 | 100 | 4 |
| 3 | 110 | 6 |
| 4 | 001 | 1 |
| 5 | 011 | 3 |
| 6 | 101 | 5 |
| 7 | 111 | 7 |

Each location in instruction window 202 has a corresponding location in temporary buffer 403. The least significant bit indicates the bucket in instruction window 202 where the instructions originated. This bit is interpreted differently when the bucket containing the instruction changes. For example, when all four instructions of bucket 0 are retired, the instructions in bucket 1 drop into bucket 0. When this occurs the LSB (least significant bit) of the tag that previously indicated bucket 1, now indicates bucket 0. For example, in Table 1, an LSB of 1 indicates the instructions in bucket 1. When these instructions are dropped into bucket 0, the LSB will not change and an LSB of 1 will indicate bucket 0. The tag contains information on how to handle each instruction.

When the instruction is executed and its results are output from a functional unit, the tag follows. Three bits of each instruction's tag uniquely identify the register location where the results of that instruction are to be stored. A temporary write block (not shown) looks at functional units 104, the instruction results and the tags. Each functional unit 104 has 1 bit that indicates if a result is going to be output from that functional unit 104 on the next clock cycle. The temporary write block gets the tag for each result that will be available on the next clock cycle. The temporary write block generates an address (based on the tag) where the upcoming results are to be stored in temporary buffer 403. The temporary write block addresses temporary buffer 403 via RRC 204 on the next clock cycle when the results are ready at functional unit 104.

As noted above, a function of the tags is to permit the results of a particular functional unit 104 can be routed directly to the operand input of a functional unit 104. This occurs when a register value represents an operand that is needed immediately by a functional unit 104. The results can also be stored in register array 404 or temporary buffer 403.

In addition, the tags indicate to the IEU when to return those results directly to bypass multiplexers 106 for immediate use by a instruction executing in the very next clock cycle. The instruction results may be sent to either the bypass multiplexers 106, register file 102, or both.

The results of all instructions executed out of order are stored first in a temporary buffer 403. As discussed above, temporary buffer 403 has eight storage locations. This number corresponds to the size of instruction window 202. In the example discussed above, instruction window 202 has eight locations and thus there are up to eight pending instructions. Consequently, up to eight instruction results may need to be stored in temporary buffer 403.

If an instruction is completed in order, that is all previous instructions are already completed and their results written to register array 404, the results of that instruction can be written directly to register array 404. RCB 409 knows if results can go directly to register array 404. In this situation, RCB 409 sets an external write bit enabling a write operation to register array 404. Note, in the preferred embodiment, the results in this situation are still written to temporary buffer 403. This is done for simplicity.

For each instruction result in temporary buffer 403, when all previous instructions are complete, without any exceptions or branch mispredictions, that result is transferred from temporary buffer 403 to a register array 404 via selection logic 408. If an instruction is completed out of order and previous instructions are not all completed, the results of that instruction remain in temporary buffer 403 until all previous instructions are completed. If one or more instructions have been completed, and they are all awaiting completion of an instruction earlier in the program order, they cannot be retired. However, once this earlier instruction is completed, the entire group is retirable and can be retired.

A done block 420 is an additional state machine of the processor. Done block 420 keeps track of what instructions are completed and marks these instructions 'done' using a done flag. The done block informs a retirement control block 409 which instructions are done. The retirement control block 409, containing retirement control circuitry checks the done flags to see if all previous instructions of each pending instruction are completed. When retirement control block 409 is informed that all instructions previous (in the program order) to the pending instruction are completed, the retirement control block 409 determines that the pending instruction is retirable.

Figure 6A:
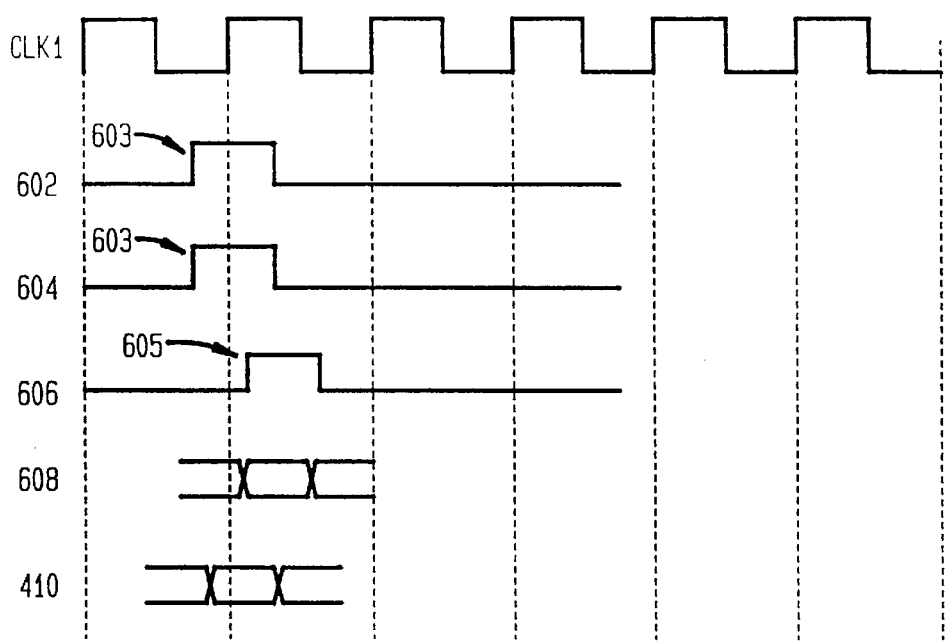
FIG. 6A is a timing diagram illustrating data writing to a register array according to the present invention.
Figure 6B:
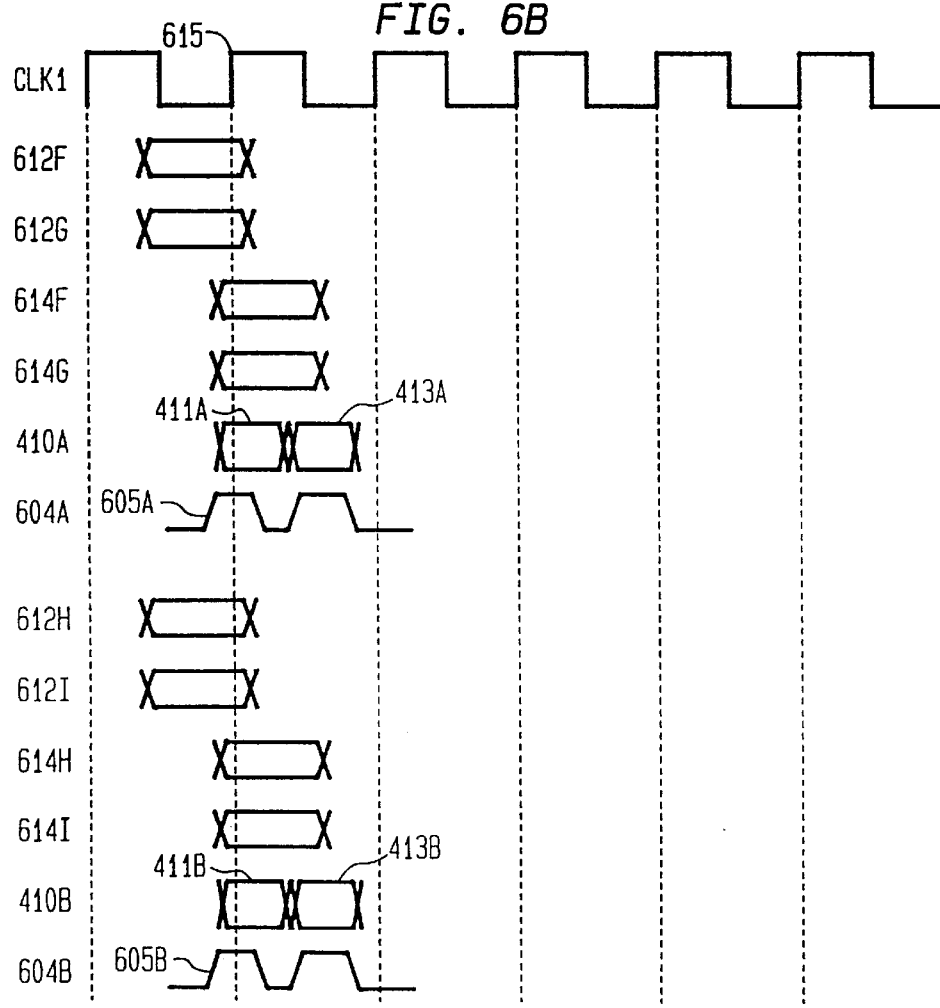
FIG. 6B is a timing diagram illustrating writing results to four register locations per clock cycle according to the present invention.

FIG. 6A is a timing diagram illustrating writing to register array 404, and FIG. 6B is a timing diagram illustrating the transfer of data from temporary buffer 403 to register array 404. Referring to FIGS. 4, 6A, and 6B, the technique of writing to register array 404 will be described.

Temporary buffer 403 has four output ports F, G, H, and I that are used to transfer data to register array 404. Register array 404 has two input ports, A' and B', for accepting instruction results from either temporary buffer 403 or functional units 104. Write enable signals 602 and 604 enable writes to temporary buffer 403 and register array 404, respectively, as shown at 603. Although not illustrated, there are actually 2 write enable signals 604 for register array 404. One of these enable signals 604 is for enabling writes to input port A', and the other is for enabling writes to input port B'. Since there are two input ports A', and B', two writes to register array 404 can occur simultaneously.

Data to be written to register array 404 can come from either temporary buffer 403 or functional units 104 (via selection multiplexer 108 and bus 411). Control signal 606 is used to select the data in selection logic 408. When control signal 606 is a logic high, for example, data is selected from temporary buffer 403. Signal 410 is the write address, dictating the location where data is to be written in either temporary buffer 403 or register array 404. Data signal 608 represents the data being transferred from temporary buffer 403 to register array 404. Alternatively, data signal 608 represents data 110 from functional units 104 via selection multiplexer 108.

Register array 404 can write 4 locations in one clock cycle. Address 410 and write enable 604 signals are asserted first, then data 608 and control signal 606 are asserted. Control signal 606 is asserted as shown at 605. During the first half of the cycle, registers corresponding to instructions I0 and I1 will be updated. During the second half of the cycle, registers corresponding to I2 and I3 will be updated. If any of the results are long words, the upper half of the word will be updated during the second cycle. Thus, two results can be simultaneously transferred and two instructions can be simultaneously retired in a half a clock cycle. A total of four instructions can therefore be retired per clock cycle.

Referring to FIG. 6B, read addresses 612F, 612G, 612H, and 612I are available for temporary buffer 403 output ports F through I. Data 614F, 614G, 614H, and 614I is available from temporary buffer 403 at the beginning of the clock cycle, as shown at 615. Addresses 410A are generated for input port A' and 410B are generated for input port B'. Similarly, a write enable signal 604A for input port A' and a write enable signal 604B for input port B' are generated for each half of the clock cycle. Address 410 appearing in the first half of the clock cycle, as shown at 611A and 611B, is the location to which data is written during enable signal 604 appearing in the first half, as shown as 605A and 605B. Similarly, data is written during the second half of the clock cycle to the address 410 appearing at that time, as shown at 613A and 613B. Since data is written to A' and B' simultaneously, up to four instruction results may be written to register array 404 during one clock cycle. Therefore, up to four instructions may be retired during one clock cycle.

Latches in selection logic 408 hold the data constant until the appropriate address 410 is present and write enable signals 604 allow the data to be written.

The process of transferring a result from temporary buffer 403 to register array 404, as described above, is called retiring. When an instruction is retired, it can be considered as officially completed. All instructions previous to that instruction have been completed without branch mispredictions or exceptions and the state of the machine will never have to be redetermined prior to that point. As a result, to the program running in the processor, it appears that the instructions are updated and executed sequentially.

Since instructions are being issued and executed out of order, subsequent instructions may require operands corresponding to results (values) in temporary buffer 403 or register array 404. Therefore, access to register values in temporary buffer 403, as well as values stored in register array 404 is provided by the present invention.

Read access to temporary buffer 403 and register file 404 is controlled by RRC 204. Such read access is required by instructions executing that need results of previously executed instructions. Recall from the discussion in subsection 2 above that RRC 204 performs data dependency checking. RRC 204 knows which instructions are dependent on which instructions and which instructions have been completed. RRC 204 determines if the results required by a particular instruction must be generated by a previous instruction, i.e. whether a dependency exists. If a dependency exists, the previous instruction must be executed first. An additional step is required, however, when a dependency exists. This step is determining where to look for the results of the instruction. Since RRC 204 knows what instructions have been completed, it also knows whether to look for the results of those instructions in temporary buffer 403 or register array 404.

RRC 204 sends a port read address 410 to register array 404 and temporary buffer 403 to read the data from the correct location onto output lines 412. One bit of read address 410 indicates whether the location is in temporary buffer 403 or register array 404. Again, see the commonly owned, co-pending application titled "Superscalar RISC Instruction Scheduling", Ser. No. 07/860,719, filed on Mar. 31, 1991 for additional disclosure pertaining to the RRC.

In the preferred embodiment of the present invention, each output port A through E of temporary buffer 403 and register array 404 has its own dedicated address line. That is, each memory location can be output to any port.

4. Additional Features of the Invention

IRU 200 also informs other units when instructions are retired. IRU 200 informs an Instruction Fetch Unit (IFU) when it (the IRU) has changed the state of the processor. In this manner, the IFU can maintain coherency with IEU 100. The state information sent to the IFU is the information required to update the current Program Counter and to request more instructions from the IFU. In the example above, when four instructions are retired, the IFU can increment the PC by four and fetch another bucket of four instructions.

An example of the IFU is disclosed in a commonly owned, copending application Ser. No. 07/817,810 titled "High Performance RISC Microprocessor Architecture."

In addition, according to a preferred embodiment of the present invention, status bits and condition codes are retired in order as well. Each of the eight instructions in instruction window 202 has its own copy of the status bits and condition codes. If an instruction does not affect any of the status bits, then it propagates the status bits from the previous instruction.

When an instruction is retired, all its status bits have to be officially updated. If more than one instruction is retired in one cycle, the status bits of the most recent (in order) instruction are used for the update.

5. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A superscalar processor that executes a group of instructions, one of more of the group of instructions executed out of a program order, the superscalar processor comprising:

a register renaming circuit that assigns tags to instructions;

an index-addressable temporary buffer that stores results of executed instructions, wherein at least part of a tag assigned to an instruction indicates a location in said index-addressable temporary buffer where an execution result for the instruction is to be stored;

a register array that stores results of instructions that are retirable;

data dependency checking logic that determines whether an executed instruction is retirable; and an instruction retirement unit that retires approximately simultaneously a group of retirable instructions by transferring execution results of said group of retirable instructions from said index-addressable temporary buffer to said register array, wherein said execution results of said group of retirable instructions are retrieved from said index-addressable temporary buffer based on at least part of each tag assigned to an instruction in said group of retirable instructions.

2. The superscalar processor of claim 1, wherein the value of a tag is based on the location of said instruction in an instruction window.

3. The superscalar processor of claim 1, wherein said instruction retirement unit comprises retirement control logic that retires instructions executed in said program order by transferring an execution result directly from a functional unit to said register array.

4. The superscalar processor of claim 1, wherein said group of retirable instructions includes at least two instructions.

5. The superscalar processor of claim 1, wherein said group of retirable instructions includes four instructions.

6. The superscalar processor of claim 1, wherein said instruction retirement unit comprises selection logic that transfers simultaneously more than one instruction execution result from said temporary buffer to said register array.

7. The superscalar processor of claim 1, further comprising:
   done logic that assigns done flags to one or more instructions determined to have been executed, and
   wherein said data dependency checking logic includes a retirement control circuit that checks said done flags to determine whether all instructions appearing earlier in the program order have completed to thereby determine whether each executed instruction is retirable.

8. The superscalar processor of claim 1, further comprising:
   selection logic that receives execution results of one or more retirable instructions from said index-addressable temporary buffer, directly receives execution results of instructions that have been executed by a functional unit, and selectively transfers execution results to said register array.

9. The superscalar processor of claim 1, wherein said index-addressable temporary buffer comprises:
   a plurality of storage locations that store the results of instructions executed out of program order according to said tags generated by said register renaming circuit.

10. The superscalar processor of claim 9, wherein said index-addressable temporary buffer further comprises:
    a plurality of address ports in communication with said plurality of storage locations that receives at least part of said tags to thereby address said plurality of storage locations to store the results;
    a plurality of input ports in communication with said plurality of storage locations that receives the results to be stored in said index-addressable temporary buffer;
    a first plurality of output ports in communication with said plurality of storage locations that outputs the results to said register array; and
    a second plurality of output ports in communication with said plurality of storage locations that outputs the results to one or more functional units in the superscalar processor.

11. The superscalar processor of claim 1, wherein said instruction retirement unit comprises selection logic that transfers execution results of more than one instruction from said index-addressable temporary buffer to said register array in a single clock cycle.

12. A superscalar processor that executes a group of instructions, one of more of the group of instructions executed out of a program order, the superscalar processor comprising:
    data dependency checking logic that determines whether an executed instruction is retirable;
    a temporary buffer that stores results of instructions that are executed, at least one of said instructions being executed out of a program order; and
    a register array that stores execution results of retirable instructions, said register array receiving execution results that are transferred from said temporary buffer, said register array further receiving execution results that are transferred directly from a functional unit.

13. The superscalar processor of claim 12, wherein said temporary buffer is an index-addressable temporary buffer, execution results in said index-addressable temporary buffer being addressable by tags that include an address of a storage location in said index-addressable temporary buffer.

14. The superscalar processor of claim 13, further comprising a register renaming circuit that generates one or more tags to specify the storage location of execution results in said index-addressable temporary buffer, wherein the value of a tag for an instruction is based on the location of said instruction in an instruction window.

15. The superscalar processor of claim 14, wherein said temporary buffer comprises:
    a plurality of storage locations that store the results of instructions executed out of program order according to said tags generated by said register renaming circuit.

16. The superscalar processor of claim 15, wherein said temporary buffer further comprises:
    a plurality of address ports in communication with said plurality of storage locations that receives at least part of said tags to thereby address said plurality of storage locations to store the results;
    a plurality of input ports in communication with said plurality of storage locations that receives the results to be stored in said temporary buffer;
    a first plurality of output ports in communication with said plurality of storage locations that outputs the results to said register array; and
    a second plurality of output ports in communication with said plurality of storage locations that outputs the results to one or more functional units in the superscalar processor.

17. The superscalar processor of claim 12, wherein execution results of more than one instruction are transferred approximately simultaneously from said temporary buffer to said register array.

18. The superscalar processor of claim 12, wherein execution results of at least two instructions are transferred from said temporary buffer to said register array in a single clock cycle.

19. The superscalar processor of claim 12, wherein execution results of four instructions are transferred from said temporary buffer to said register array in a single clock cycle.

20. The superscalar processor of claim 12, further comprising:
    done logic that assigns done flags to one or more instructions determined to have been executed, and
    wherein said data dependency checking logic includes a retirement control circuit that checks said done flags to determine whether all instructions appearing earlier in the program order have completed to thereby determine whether each executed instruction is retirable.

21. The superscalar processor of claim 12, further comprising:
   selection logic that receives execution results of one or more retirable instructions from said temporary buffer, directly receives execution results of instructions that have been executed by a functional unit, and selectively transfers execution results to said register array.

22. A computer system, comprising:
   a memory unit having stored therein program instructions; and
   a processor that receives said program instructions via a bus, wherein said processor comprises an instruction retirement system, including
      data dependency checking logic that determines whether an executed instruction is retirable;
      a temporary buffer that stores results of executed instructions, wherein at least one of said instructions is being executed out of a program order; and
      a register array that stores execution results of retirable instructions from said temporary buffer, wherein said register array further receives execution results directly from a functional unit.

23. The computer system of claim 22, wherein said temporary buffer is an index-addressable temporary buffer, execution results in said index-addressable temporary buffer being addressable by tags that include an address of a storage location in said index-addressable temporary buffer.

24. The computer system of claim 23, further comprising a register renaming circuit that generates one or more tags to specify the storage location of execution results in said index-addressable temporary buffer, wherein the value of a tag for an instruction is based on the location of said instruction in an instruction window.

25. The computer system of claim 24, wherein said temporary buffer comprises:
   a plurality of storage locations that store the results of instructions executed out of program order according to said tags generated by said register renaming circuit.

26. The computer system of claim 25, wherein said temporary buffer further comprises:
   a plurality of address ports in communication with said plurality of storage locations that receives at least part of said tags to thereby address said plurality of storage locations to store the execution results;
   a plurality of input ports in communication with said plurality of storage locations that receives the execution results to be stored in said temporary buffer;
   a first plurality of output ports in communication with said plurality of storage locations that outputs the execution results to said register array; and
   a second plurality of output ports in communication with said plurality of storage locations that outputs the execution results to one or more functional units in the superscalar processor.

27. The computer system of claim 22, wherein execution results of more than one instruction are transferred approximately simultaneously from said temporary buffer to said register array.

28. The computer system of claim 22, wherein execution results from at least two instructions are transferred from said temporary buffer to said register array in a single clock cycle.

29. The computer system of claim 22, wherein execution results of four instructions are transferred from said temporary buffer to said register array in a single clock cycle.

30. The computer system of claim 22, further comprising:
   done logic that assigns done flags to one or more instructions determined to have been executed, and
   wherein said data dependency checking logic includes a retirement control circuit that checks said done flags to determine whether all instructions appearing earlier in the program order have completed to thereby determine whether each executed instruction is retirable.

31. The computer system of claim 22, further comprising:
   selection logic that receives execution results of one or more retirable instructions from said temporary buffer, directly receives execution results of instructions that have been executed by a functional unit, and selectively transfers execution results to said register array.

32. A computer system, comprising:
   a memory unit having stored therein program instructions;
   a bus that transfers said program instructions; and
   a processor that receives said program instructions from said bus, wherein said processor comprises an instruction retirement system, including
      a register renaming circuit that assigns tags to instructions;
      an index-addressable temporary buffer that stores results of executed instructions, wherein at least part of a tag assigned to an instruction indicates a location in said index-addressable temporary buffer where an execution result for the instruction is to be stored;
      a register array that stores execution results of instructions that are retirable;
      data dependency checking logic that determines whether an executed instruction is retirable; and
      an instruction retirement unit that retires approximately simultaneously a group of retirable instructions by transferring execution results of said group of retirable instructions from said index-addressable temporary buffer to said register array, wherein said execution results of said group of retirable instructions are retrieved from said index addressable temporary buffer based on at least part of each tag assigned to an instruction in said group of retirable instructions.

33. The computer system of claim 32, wherein the value of a tag is based on the location of said instruction in an instruction window.

34. The computer system of claim 32, further comprising retirement control logic that retires instructions executed in said program order by transferring an execution result directly from a functional unit to said register array.

35. The computer system of claim 32, wherein said group of retirable instructions includes at least two instructions.

36. The computer system of claim 32, wherein said group of retirable instructions includes four instructions.

37. The computer system of claim 32, wherein said instruction retirement unit comprises selection logic that simultaneously transfers more than one instruction execution result from said temporary buffer to said register array.

38. The computer system of claim 32, further comprising:
   done logic that assigns done flags to one or more instructions determined to have been executed, and
   wherein said data dependency checking logic includes a retirement control circuit that checks said done flags to determine whether all instructions appearing earlier in the program order have completed to thereby determine whether each executed instruction is retirable.

39. The computer system of claim 32, further comprising: selection logic that receives execution results of one or more retirable instructions from said index-addressable temporary buffer, directly receives execution results of instructions that have been executed by a functional unit, and selectively transfers execution results to said register array.

40. The computer system of claim 32, wherein said index-addressable temporary buffer comprises:

a plurality of storage locations that store the results of instructions executed out of program order according to said tags generated by said register renaming circuit.

41. The computer system of claim 40, wherein said index-addressable temporary buffer further comprises:

a plurality of address ports in communication with said plurality of storage locations that receives at least part of said tags to thereby address said plurality of storage locations to store the results;

a plurality of input ports in communication with said plurality of storage locations that receives the results to be stored in said index-addressable temporary buffer;

a first plurality of output ports in communication with said plurality of storage locations that outputs the results to said register array; and a second plurality of output ports in communication with said plurality of storage locations that outputs the results to one or more functional units in the superscalar processor.

* * * * *

UNITED STATES PATENT AND TRADEMARK OFFICE
CERTIFICATE OF CORRECTION

PATENT NO. : 6,412,064 B1  Page 1 of 1
DATED : June 25, 2002
INVENTOR(S) : Wang et al.

It is certified that error appears in the above-identified patent and that said Letters Patent is hereby corrected as shown below:

Title page,
Item [63], Related U.S. Application Data, please replace "February 20, 1998" with -- January 20, 1998 --.

Column 1,
Line 7, please replace "February 20, 1998" with -- January 20, 1998 --.

Signed and Sealed this

Twenty-sixth Day of November, 2002

*Attest:*

*Attesting Officer*

JAMES E. ROGAN
*Director of the United States Patent and Trademark Office*